United States Patent [19]

Buell

[11] 4,224,071

[45] Sep. 23, 1980

[54] BLACK DYES FOR BALL-POINT PEN INKS

[75] Inventor: Bennett G. Buell, Bridgewater, N.J.

[73] Assignee: American Cyanamid Company, Stamford, Conn.

[21] Appl. No.: 30,680

[22] Filed: Apr. 16, 1979

[51] Int. Cl.$^2$ .................. C09B 29/22; C09D 11/18
[52] U.S. Cl. ........................................ 106/22; 260/154
[58] Field of Search ........................ 106/22; 260/154

[56] References Cited

U.S. PATENT DOCUMENTS 3,119,806   1/1964   Voltz et al. .................... 260/154

*Primary Examiner*—Edward M. Woodberry
*Attorney, Agent, or Firm*—Bruce F. Jacobs

[57] ABSTRACT

Nitro-substituted monoazo dihydroperimidines which are useful as black dyes for ball-point pen inks are disclosed.

16 Claims, No Drawings

BLACK DYES FOR BALL-POINT PEN INKS

This invention relates to new black solvent dyes for ball-point pens. More particularly, it relates to novel black dyes represented by formula (I)

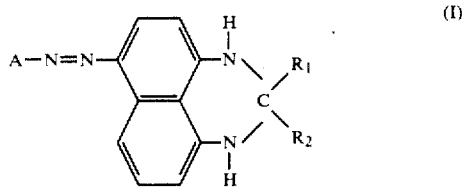

wherein A is a nitro-substituted carbocyclic aromatic radical selected from 2-nitrophenyl, 4-nitrophenyl, 2-nitronaphthyl, 4-nitronaphthyl, 2-nitroanthryl, or 4-nitroanthryl, $R_1$ and $R_2$, are alkyl radicals having a combined total of from 2 to 10 carbon atoms, carbalkoxy substituted alkyl radicals of from 3 to 9 carbon atoms wherein the alkoxy group has 1 to 6 carbon atoms, or together with the carbon to which they are attached form a carbocyclic aliphatic ring of from 5 to 8 carbon atoms, and to ink compositions for ball-point pens containing said dyes of formula (I).

Glycol-soluble dyes having certain physical properties are used as components of inks for ball-point pens. The dye must have high solubility in the vehicle used for the ink to give a solution having a viscosity within the desired range. The resulting ink composition must be free of insolubles which might cause clogging of the ball-point. The dye should have a degree of light fastness such that the dried ink will have reasonable permanence.

These requirements have been difficult to achieve in the case of black dyes. Since none has been found to be completely satisfactory, research continues in order to find black dyes with more satisfactory characteristics.

The Colour Index of the Society of Dyes and Colors discloses C.I. Solvent Black 3, a diazo compound, which is represented by the formula:

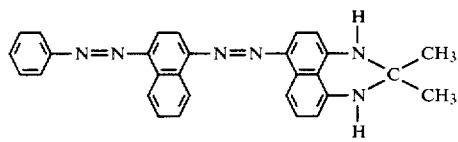

The dyes of the present invention are distinguished from the above material in that they are all nitro-substituted monoazo dihydroperimidines.

Sachs discloses in Chemical Abstracts, Vol. 3, p. 1870 (1909) nitro-substituted perimidines represented by the formula

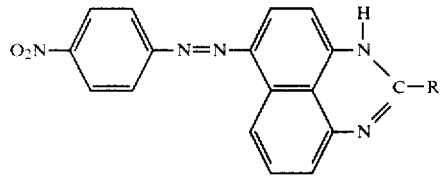

wherein R is hydrogen or methyl. The dyes of the present invention are distinguished from the above dyes in that they are all dihydroperimidines and have much better solubility, greater color intensity and yield inks having true black shades rather than the dull brown shade of the aromatic perimidines of Sachs.

In accordance with the present invention, it has been found the compounds of the above-described formula (I) are useful as black dyes for ball-point pen inks. These compounds may be incorporated into appropriate vehicles which allow them to be used as ink compositions for ball-point pens. It is surprising that the monoazo dye compounds of the present invention have such intense black shades.

The dye compounds of formula (I) can be prepared by coupling the diazonium salt of the nitro-substituted carbocyclic aromatic amine into a 2,3-dihydro-2,2-disubstituted perimidine of formula (II), wherein $R_1$ and $R_2$ are as previously defined.

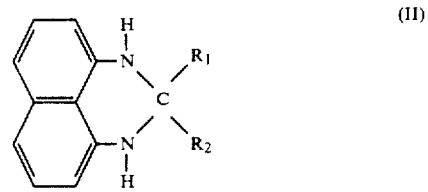

Illustrative examples of the compounds of formula (II) include:
2,3-dihydro-2,2-dimethylperimidine,
2,3-dihydro-2-ethyl-2-methylperimidine,
2,3-dihydro-2-n-butyl-2-ethylperimidine,
2,3-dihydro-2,2-diisobutylperimidine,
2,3-dihydro-2-cyclopropyl-2-methylperimidine,
2,3-dihydro-2-n-hexyl-2-methylperimidine,
2,3-dihydro-2-carbobutoxyethyl-2-methylperimidine,
2,3-dihydro-2-cyclohexyl-2-methylperimidine,
2,3-dihydro-2,2-(1,4-butylene)perimidine,
2,3-dihydro-2,2-(1,3-butylene)perimidine,
2,3-dihydro-2,2-(1,5-pentamethylene)perimidine,
2,3-dihydro-2,2-(1,6-hexamethylene)perimidine,
2,3-dihydro-2,2-(1,7-heptamethylene)perimidine, and the like.

The preparation of the compounds of formula (II) may be carried out by reacting 1,8-diaminonaphthalene with a slight excess of a suitable ketone under conditions which are well-known in the art.

Suitable ketones which may be used to prepare the compounds of formula (II) include the following:
acetone
2-butanone,
3-heptanone,
2-heptanone,
2,6-dimethyl-4-heptanone,
2-octanone,
cyclohexanone,
cyclopentanone,
cycloheptanone,
cyclooctanone,
ethyl acetoacetate,
n-butyl levulinate,
ethyl levulinate,
methyl cyclopropyl ketone,
methyl cyclohexyl ketone, and the like.

Illustrative examples of the compounds of formula (I) include the following:
2,3-dihydro-2,2-dimethyl-6-(4-nitrophenylazo)-perimidine, 2,3-dihydro-2-methyl-2-ethyl-6-(4-nitrophenylazo)-perimidine,
2,3-dihydro-2-ethyl-2-n-butyl-6-(4-nitrophenylazo)-perimidine,
2,3-dihydro-2,2-diisobutyl-6-(4-nitrophenylazo)-perimidine,
2,3-dihydro-2-methyl-2-cyclopropyl-6-(4-nitrophenylazo)perimidine,
2,3-dihydro-2-methyl-2-n-hexyl-6-(4-nitrophenylazo)perimidine,
2,3-dihydro-2-methyl-2-cyclohexyl-6-(4-nitrophenylazo)perimidine,
2,3-dihydro-2-methyl-2-carbobutoxyethyl-6-(4-nitrophenylazo)perimidine,
2,3-dihydro-2,2-(1,4-butylene)-6-(4-nitrophenylazo)-perimidine,
2,3-dihydro-2,2-pentamethylene-6-(4-nitrophenylazo)perimidine,
2,3-dihydro-2,2-hexamethylene-6-(4-nitrophenylazo)-perimidine,
2,3-dihydro-2,2-heptamethylene-6-(4-nitrophenylazo)perimidine,
2,3-dihydro-2,2-dimethyl-6-(4-nitronaphthylazo)-perimidine,
2,3-dihydro-2-methyl-2-n-octyl-6(2-nitronaphthylazo)perimidine,
2,3-dihydro-2,2-dimethyl-6-(4-nitroanthrylazo)-perimidine,
2,3-dihydro-2-methyl-2-carbobutoxyethyl-6-(2-nitroanthrylazo)perimidine, and the like.

The preferred compound of formula (I) is 2,3-dihydro-2,2-dimethyl-6-(4-nitrophenylazo)perimidine.

The black dyes of this invention may then be made into ball-point pen inks by dissolving them in a vehicle to provide a solution containing about 5–50%, preferably about 10–30%, by weight of the dye, with a minimum of insoluble materials.

Suitable vehicles for ball-point pen inks include 1,3-butylene glycol, 2-ethoxyethanol, 2-methoxyethanol diethyleneglycol monoethyl ether, diethyleneglycol monobutyl ether, dipropyleneglycol, and the like, and mixtures thereof. The preferred vehicle is a 1:1 mixture by weight of dipropylene glycol and the monobutyl ether of diethyleneglycol, or 2-methoxyethanol.

In general the ink compositions of this invention provide intense black shades having acceptable light stability.

The invention is illustrated by the following examples in which all parts are by weight unless otherwise noted.

EXAMPLE 1

Preparation of the Starting Perimidines

A mixture of 1,8-diaminonaphthalene (63.2 grams; 0.4 mole), acetone (24.7 grams; 0.425 mole), ethyl alcohol (120 grams), and p-toluenesulfonic acid (0.7 gram) is heated to 50°–60° C. After the resulting exotherm subsides, the temperature is maintained at 60° C. for 30 minutes and then cooled to crystallize the product from solution. The resulting crystals are separated by filtration, washed with alcohol, and dried. A second crop is obtained by adding water to the filtrate. The yield in two crops is 66.4 grams (85% of theoretical), m.p. 110°–112° C. Recrystallization from cyclohexane raises the melting point to 113°–115° C.

Calculated for $C_{12}H_{14}N_2$: C, 78.75; H, 7.12; N, 14.13; Found: C, 78.77; H, 7.31; N, 13.81.

In the manner described above, substituting an equimolecular amount of 2-butanone, 3-heptanone, 2,6-dimethyl-4-heptanone, cyclohexanone, and n-butyl levulinate for the acetone, the corresponding 2,3-dihydroperimidines are obtained.

EXAMPLE 2

Preparation of 2,3-Dihydro-2,2-Dimethyl-6-(4-Nitrophenylazo)-Perimidine

A solution containing 0.1 mole of the diazonium salt of p-nitroaniline is prepared by adding p-nitroaniline (13.8 grams; 0.1 mole) to hydrochloric acid (70 mls of 5N) and heating to form a solution. The solution is then poured on ice (150 grams) and a solution of sodium nitrite (7.28 grams; 0.105 mole) in water (25 grams) is then poured onto the ice mixture. When the diazotization is completed, the excess nitrous acid is destroyed by adding sulfamic acid.

A solution of the product of Example 1 (19.38 grams; 0.1 mole) in water (450 grams) and sulfuric acid (10.25 grams; 0.1 mole) is prepared and the solution of the diazonium salt is then added dropwise to the solution, while stirring the reaction mixture vigorously, until the uptake of the diazonium salt ceases. The pH of the reaction mixture is adjusted to 4 by the addition of a saturated solution of sodium acetate in water (90 grams) and the addition of the diazonium salt is then completed. The resulting precipitate is separated by filtration and is reslurried in water (400 grams). The slurry is stirred and sodium hydroxide (5N) is added thereto until the pH is alkaline to Brilliant Yellow indicator paper. The alkaline mixture is stirred at ambient temperature for one hour and filtered to separate the product. After washing the filter cake with water and drying at 60° C. under vacuum, there is obtained a blue-black solid (31.3 grams; 90% of theoretical) having an infrared absorption spectrum consistent with the proposed structure. Recrystallization of this material from ethanol gives a solid melting at 130°–132° C.

Calculated for $C_{19}H_{17}O_2N_5$: C, 65.69; H, 4.93; N, 20.16: Found: C, 65.20; H, 5.17; N, 20.35.

EXAMPLE 3

Preparation of 2,3-Dihydro-2-Ethyl-2-Methyl-6-(4-Nitrophenylazo)-Perimidine

In the manner described in Example 2, substituting 21.3 grams of 2,3-dihydro-2-ethyl-2-methylperimidine for the 2,3-dihydro-2,2-dimethylperimidine, a black powder is obtained having infrared, mass and nuclear magnetic resonance spectra consistent with the structure of the desired compound.

EXAMPLE 4

Preparation of 2,3-Dihydro-2-Ethyl-2-n-Butyl-6-(4-Nitrophenylazo)-Perimidine

In the manner described in Example 2, substituting 25.4 grams of 2,3-dihydro-2-ethyl-2-n-butylperimidine for the 2,3-dihydro-2,2-dimethylperimidine, the desired compound is obtained as a black powder in a yield of 75.8% of theoretical. The infrared absorption spectrum of the product is consistent with the proposed structure.

EXAMPLE 5

Preparation of 2,3-Dihydro-2,2-Diisobutyl-6-(4-Nitrophenylazo)-Perimidine

In the manner described in Example 2, substituting 31.8 grams of 2,3-dihydro-2,2-diisobutylperimidine for the 2,3-dihydro-2,2-dimethylperimidine, the desired compound is obtained as a black powder in a yield of 76% of theoretical.

EXAMPLE 6

Preparation of 2,3-Dihydro-2,2-(1,5-Pentamethylene)-6-(4-Nitrophenylazo)Perimidine In the manner described in Example 2, substituting 23.8 grams of 2,3-dihydro-2,2-(1,5-pentamethylene)-perimidine for the 2,3-dihydro-2,2-dimethylperimidine, the desired compound is obtained as a black powder in a high yield. The infrared absorption spectrum of the product is consistent with the proposed structure.

Calculated for $C_{22}H_{21}N_5O_2$: C, 68.20; H, 5.46; N, 18.08: Found: C, 68.67; H, 5.77; N, 16.82.

EXAMPLE 7

Preparation of 2,3-Dihydro-2-Carbobutoxyethyl-2-Methyl-6-(4-Nitrophenylazo)Perimidine In the manner described in Example 2, substituting 34.8 grams of 2,3-dihydro-2-carbobutoxyethyl-2-methylperimidine for the 2,3-dihydro-2,2-dimethylperimidine, the desired compound is obtained as a black powder in a yield of 89% of theoretical.

EXAMPLE 8

Preparation of 2,3-Dihydro-2,2-Dimethyl-6-(4-Nitronaphthylazo)-Perimidine

1-Amino-4-nitronaphthalene (9.5 grams; 0.0505 mole) is stirred in glacial acetic acid (75 mls), at room temperature, for 15 minutes. Dilute (5N) hydrochloric acid (50 mls) is added thereto and, after stirring at room temperature for 15 minutes, the reaction mixture is cooled to 0° C. Sodium nitrite (4.0 grams; 0.058 mole) in water (25 mls) is added over a period of 15 minutes and the reaction mixture is stirred at 0°–5° C. for an hour. The solution is then clarified and treated with about 0.5 gram of sulfamic acid.

A solution (217 mls) in water of the product of Example 1, containing 4.55 grams of the perimidine per 100 mls of solution, is cooled to 5° C. and the solution of the diazonium salt from above is added dropwise at 5° C. over about 5 minutes. The resulting slurry is stirred at 5° C. for 2 hours and the pH is adjusted to about 4 with dilute sodium hydroxide (5N). The slurry is stirred for about 30 minutes and filtered. The filter cake is slurried in water, made alkaline to pH 8.5 with sodium hydroxide, for one hour and filtered. The filter cake is then reslurried in water, filtered and dried at 60° C. There is obtained 17.0 grams of a dark powder.

Calculated for $C_{23}H_{19}N_5O_2$: C, 69.51:, H, 4.82%; N, 17.6%: Found: C, 68.37%; H, 4.91%; N, 16.24%.

EXAMPLE 9

Preparation of 2,3-Dihydro-2,2-Dimethyl-6-(2-Nitrophenylazo)-Perimidine

In the manner described in Example 2, substituting 13.8 grams of o-nitroaniline for the p-nitroaniline, the desired compound is obtained.

EXAMPLE 10

Preparation of 2,3-Dihydro-2,2-Dimethyl-6-(2-Nitronaphthylazo)-Perimidine

In the manner described in Example 8, substituting 9.5 grams of 1-amino-2-nitronaphthalene for the 1-amino-4-nitronaphthalene, the desired compound is obtained.

Example 11

Preparation of 2,3-Dihydro-2,2-Dimethyl-6-(4-Nitroanthrylazo)-Perimidine

In the manner described in Example 8, substituting 12.0 grams of 1-amino-4-nitroanthracene for the 1-amino-4-nitronaphthalene, the desired compound is obtained.

EXAMPLE 12

The black dye of Example 2 is dissolved in a mixture of equal parts by weight of dipropylene glycol and diethyleneglycol monobutyl ether to provide a solution containing 20% by weight of the dye. The dye solution is an intense black with excellent hiding powder. The material shows adequate resistance to light when tested at 20% by weight in the solvent mixture noted above.

In the manner described above, substituting the black dye of Example 3 for the dye of Example 2, similar results are obtained except that the shade is redder.

In the manner described above, substituting the black dye of Example 8 for the dye of Example 2, similar results are obtained except that the shade is bluer.

COMPARATIVE EXAMPLE

Preparation and Testing of 2-(4-Dimethylaminophenyl)-6-(4-Nitrophenylazo)-Perimidine The compound of Sachs cited above was prepared and tested for its utility as a black dye as follows:

A mixture of 1,8-diaminonaphthalene (31.8 grams; 0.2 mole) and p-dimethylaminobenzaldehyde (31.7 grams; 0.202 mole) in ethyl alcohol (200 grams) is heated to 65°–75° C. After a slight exotherm, a thick precipitate separates from solution. After cooling, the precipitate is separated to obtain a crystalline solid (43.28 grams; m.p. 160°–164° C.) having a suitable infrared absorption spectrum. Recrystallization of the crude product from 2-methoxyethanol increases the melting point to 165.5°–166.5° C.

The 2,3-dihydro-2-(4-dimethylaminophenyl)perimidine of above (30 grams; 0.104 mole), 10% palladium-on-charcoal (10 grams) and xylene (250 grams) is heated at reflux for 0.5 hour and then filtered. Cooling the filtrate yields a yellow solid which after recrystallization from benzene amounts to 17.9 grams (m.p. 215°–217° C. in vacuo) of 2-(4-dimethylaminophenyl)-perimidine.

The 2-(4-dimethylaminophenyl)perimidine (2.87 grams; 0.01 mole) from above is mixed with acetic acid (50 grams), 17% hydrochloric acid (10.8 grams), and a solution of the diazonium compound from p-nitroaniline (0.01 mole) (as prepared in Example 2 above) is treated with a standard solution of sodium acetate in water until neutral to Congo Red; coupling is completed within one hour. The product (3.86 grams) is isolated by filtration and the structure is confirmed by the absence of a fixed -NH- band in its infrared absorption spectrum. Solutions of the compound are dull brown, not black.

The solubility of the product in solvents common to felt marker and ball-point ink formulations is too poor for testing.

What is claimed is:

1. A dye compound, useful in ball-point inks, represented by formula (I)

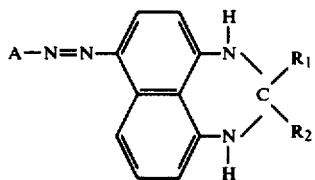

wherein A is a nitro-substituted carbocyclic aromatic radical selected from the group consisting of 2-nitrophenyl, 4-nitrophenyl, 2-nitronaphthyl, 4-nitronaphthyl, 2-nitroanthryl, and 4-nitroanthryl, $R_1$ and $R_2$ are alkyl radicals having a combined total of from 2 to 10 carbon atoms, carbalkoxy substituted alkyl radicals of from 3 to 9 carbon atoms wherein the alkoxy group has 1 to 6 carbon atoms, or together with the carbon to which they are attached from a carbocyclic aliphatic ring of from 5 to 8 carbon atoms.

2. The compound of claim 1 wherein $R_1$ and $R_2$ are methyl, and A is 4-nitrophenyl.

3. The compound of claim 1 wherein $R_1$ is methyl, $R_2$ is ethyl, and A is 4-nitrophenyl.

4. The compound of claim 1 wherein $R_1$ is ethyl, $R_2$ is n-butyl, and A is 4-nitrophenyl.

5. The compound of claim 1 wherein $R_1$ and $R_2$ are isobutyl, and A is 4-nitrophenyl.

6. The compound of claim 1 wherein $R_1$ and $R_2$ taken together with the carbon atom to which they are attached form a cyclohexane ring, and A is 4-nitrophenyl.

7. The compound of claim 1 wherein $R_1$ and $R_2$ are methyl, and A is 4-nitronaphthyl.

8. The compound of claim 1 wherein $R_1$ is methyl, $R_2$ is carbobutoxyethyl, and A is 4-nitrophenyl.

9. An ink composition for ball-point pens comprising an effective amount of a dye compound of formula (I)

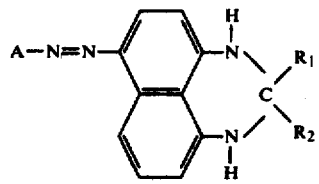

wherein A is a nitro-substituted carbocyclic aromatic radical selected from the group consisting of 2-nitrophenyl, 4-nitrophenyl, 2-nitronaphthyl, $R_1$ and $R_2$ are alkyl radicals having a combined total of from 2 to 10 carbon atoms, carbalkoxy substituted alkyl radical of from 3 to 9 carbon atoms wherein the alkoxy group has 1 to 6 carbon atoms, or together with the carbon to which they are attached form a carbocyclic aliphatic ring of from 5 to 8 carbon atoms, dissolved in a vehicle suitable for ball-point pen inks.

10. The composition of claim 9 wherein $R_1$ and $R_2$ are methyl, and A is 4-nitrophenyl.

11. The composition of claim 9 wherein $R_1$ is methyl, $R_2$ is ethyl, and A is 4-nitrophenyl.

12. The composition of claim 9 wherein $R_1$ is ethyl $R_2$ is n-butyl, and A is 4-nitrophenyl.

13. The composition of claim 9 wherein $R_1$ and $R_2$ are isobutyl, and A is 4-nitrophenyl.

14. The composition of claim 9 wherein $R_1$ and $R_2$ together with the carbon atom to which they are attached form a cyclohexane ring, and A is 4-nitrophenyl.

15. The composition of claim 9 wherein $R_1$ and $R_2$ are methyl, and A is 4-nitronaphthyl.

16. The composition of claim 9 wherein $R_1$ is methyl, $R_2$ is carbobutoxyethyl, and A is 4-nitrophenyl.

* * * * *